United States Patent
Zhou et al.

(10) Patent No.: US 6,650,757 B1
(45) Date of Patent: Nov. 18, 2003

(54) METHOD AND SYSTEM TO DETECT UNWANTED NOISE

(75) Inventors: David Zhou, Dearborn Heights, MI (US); Francois Charette, Canton, MI (US); Keng D. Hsueh, West Bloomfield, MI (US); Vy Tran, Canton, MI (US); Hsiao-An Hsieh, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/405,020

(22) Filed: Sep. 27, 1999

(51) Int. Cl.[7] .................. A61F 11/06; H04B 15/00; H04B 1/00
(52) U.S. Cl. .................. 381/71.4; 386/71.12; 386/94.1; 386/86; 386/71.1
(58) Field of Search .................. 381/71.4, 71.1, 381/86, 71.12, 94.1

(56) References Cited

U.S. PATENT DOCUMENTS

| | | |
|---|---|---|
| 3,858,439 A | 1/1975 | Nakamura |
| 4,524,620 A | 6/1985 | Wright et al. |
| 4,884,449 A | 12/1989 | Nishimoto et al. |
| 5,001,931 A | 3/1991 | Nishimoto et al. |
| 5,140,858 A | 8/1992 | Nishimoto et al. |
| 5,539,832 A * | 7/1996 | Weinstein et al. ............ 381/94 |
| 5,581,619 A * | 12/1996 | Shibata et al. ............. 381/71.4 |
| 5,596,496 A | 1/1997 | Loeffler |
| 5,602,539 A | 2/1997 | Lemoine et al. |
| 5,602,927 A * | 2/1997 | Tamamura et al. ......... 381/71.4 |
| 5,805,080 A | 9/1998 | Lemoine et al. |
| 5,917,919 A * | 6/1999 | Rosenthal ................ 381/71.11 |

FOREIGN PATENT DOCUMENTS

| | | | |
|---|---|---|---|
| DE | 41 23 576 A1 | 2/1992 | |
| EP | 1087214 A2 * | 3/2001 | ............ G01H/3/00 |

* cited by examiner

Primary Examiner—Forester W. Isen
Assistant Examiner—Laura A. Grier
(74) Attorney, Agent, or Firm—Gregory P. Brown

(57) ABSTRACT

An apparatus for detecting unwanted noise includes a reference sensor that generates a reference signal in response to stimulation by a source. A combined noise detector picks up a combined noise signal, which includes both background noise and the unwanted noise generated by the source. A noise separation synthesis device filters both signals to generate a coherent unwanted noise signal from the combined noise signal as a function of the reference signal generated by the reference sensor. A comparator determines the presence of unwanted noise by calculating the Kurtosis value of the coherent unwanted noise signal.

21 Claims, 1 Drawing Sheet

METHOD AND SYSTEM TO DETECT UNWANTED NOISE

TECHNICAL FIELD

The present invention relates generally to acoustic emission monitoring and more particularly to a method and system to detect unwanted noise.

BACKGROUND ART

There are many instances when it is desirable to analyze an acoustic signal. This is especially true in the automotive field when determining how much noise will be heard by the occupants of a motor vehicle. Depending on the level and type of noise, it is often a desire to reduce any noise to provide a motor vehicle with quiet operating characteristics.

Eliminating noise can best be accomplished by eliminating the source of the noise. Because noise, especially in motor vehicles, is a composite of many different noises, the source is often difficult to identify. Most of the noise in motor vehicles is generated by the powertrain, the interaction between the road and the tire, and the wind created under driving conditions. These three types of noise have different characteristics and generally generate random noise. For example, the overall noise at a specific speed may have a substantially different characteristic if the powertrain is providing substantial torque at that speed. Likewise, the overall noise may be affected by the condition of the road on which the motor vehicle is traveling. Therefore, there is a need to isolate the sources of overall noise under various operating conditions.

Specifically, industry has been trying to objectively measure the squeak of stabilizer bar bushings for years without success. Industry has not succeeded mainly because of acoustic contamination by background noise, i.e., surrounding equipment, fan, etc. Also, the frequency band being examined was typically lower than 2000 Hz. In lieu of an objective measurement, industry has resorted to relying on subjective evaluations that depend significantly on operator perception.

It would therefore be desirable to have a way to objectively measure stabilizer bar bushing squeak while eliminating the need for subjective evaluations. Additionally, it would be desirable to make the determination of bushing squeak more consistent and reliable.

SUMMARY OF THE INVENTION

It is an object of the invention to provide an improved and reliable method and system to detect unwanted noise. Another object of the invention is to provide a way to objectively measure unwanted noise while eliminating the need for subjective evaluations. An additional object of the invention is to make the determination of unwanted noise more consistent and reliable.

Accordingly, an apparatus for detecting unwanted noise over background noise, which is generated by a noisy source, is disclosed. In one aspect of the invention, an apparatus for detecting unwanted noise includes a reference sensor that generates a reference signal in response to stimulation by a source. A combined noise detector picks up a combined noise signal, which includes both background noise and the unwanted noise generated by the source. A noise separation synthesis device filters both signals to generate a coherent unwanted noise signal from the combined noise signal as a function of the reference signal generated by the reference sensor. A comparator determines the presence of unwanted noise by calculating the Kurtosis value of the coherent unwanted noise signal.

The present invention achieves an improved and reliable method and system to detect unwanted noise. One advantage associated with the present invention is the ability to analyze components of a signal by filtering then out of the signal in the time domain rather than in the frequency domain.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODE(S) FOR CARRYING OUT THE INVENTION

Figure 1:
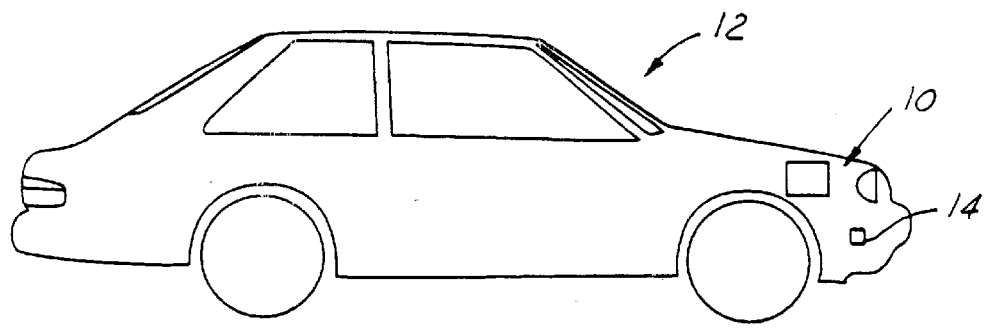
FIG. 1 is a block diagram of a vehicle having a system for detecting unwanted noise according to one aspect of the invention.

Referring to FIG. 1, a block diagram of a vehicle 12 having a system 10 for detecting unwanted noise according to one aspect of the invention is illustrated. An apparatus for detecting unwanted noise 10 generated by a noisy source 14, over background noise, is located in vehicle 12. In the present invention, the noisy source 14 is a stabilizer bar bushing. Noisy source 14 may also include various engine components, instrument panel components, or steering linkages. These examples used to show a noisy source 14 are not exhaustive, as there may exist other noisy sources 14 which may generate noise or vibration. Further, the apparatus for detecting unwanted noise 10 may be used in environments other than a vehicle 12.

Figure 2:
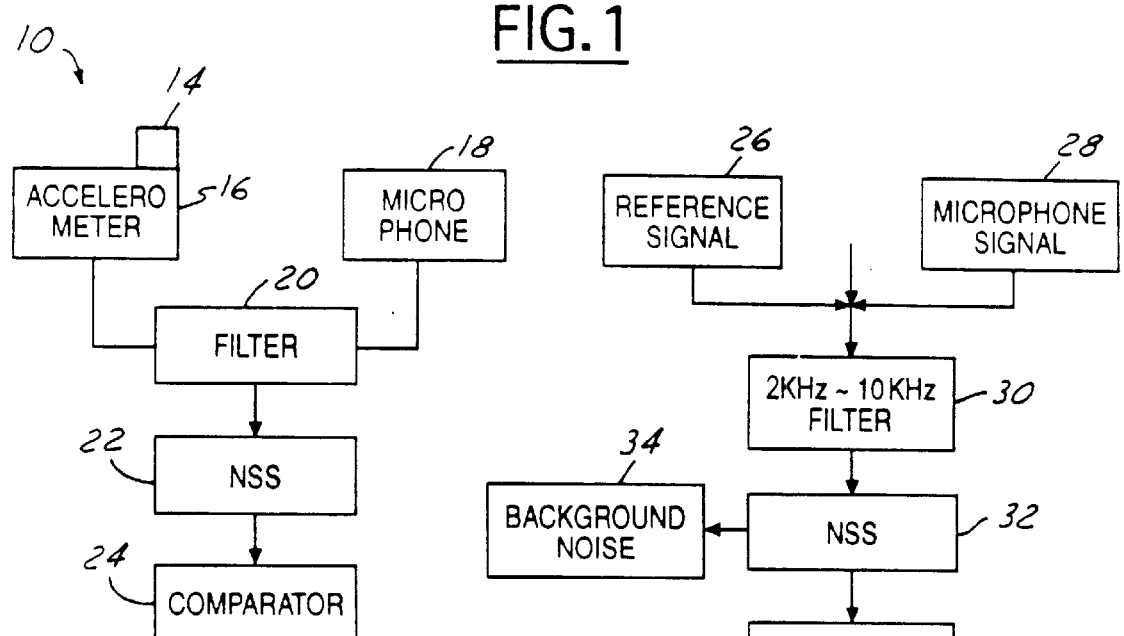
FIG. 2 is a block diagram of an apparatus to detect unwanted noise according to one aspect of the invention.

Referring to FIG. 2, a block diagram of an apparatus to detect unwanted noise 10 according to one aspect of the invention is illustrated. The apparatus to detect unwanted noise 10 includes a single reference sensor 16. In an alternative embodiment, the reference sensor 16 may include an array of sensors. The reference sensor 16 is mounted to, and generates a reference signal in response to stimulation by, noisy source 14, i.e., the stabilizer bar bushing. In the present embodiment, reference sensor 16 is an accelerometer mounted directly to the stabilizer bar bushing bracket.

A single combined noise detector 18 is located in close proximity to noisy source 14. In an alternative embodiment, the combined noise detector 18 may include an array of detectors. Combined noise detector 18 generates a combined signal that is made up of background noise and the unwanted noise generated by noisy source 14, i.e., the squeak from the stabilizer bar bushing. In the present embodiment, combined noise detector 18 is a microphone mounted in close proximity to the stabilizer bushing.

A filter 20 is coupled to reference sensor 16 and combined noise detector 18. Filter 20 pre-filters some of the extraneous background noise before the combined signal is processed allowing for more reliable noise detection. In the present embodiment, filter 20 is a band pass filter. Because stabilizer bar bushing squeak generates a noise having a frequency between 2,000–10,000 Hz, filter 20 filters both the reference signal and the combined signal between 2,000 Hz and 10,000 Hz.

A noise separation synthesis device 22 is coupled to filter 20 and receives the filtered reference signal and the filtered combined signal. The noise separation synthesis device 22 separates a coherent unwanted noise signal from the combined signal as a function of the reference signal generated by reference sensor 16. More specifically, noise separation synthesis device 22 is capable of determining, based on the reference signal received from the reference sensor 16, what component of the combined signal, generated by the combined noise detector 18, is due to the noisy source 14. Noise separation synthesis device 22 uses a least-mean-square algorithm to adapt the coefficients of the device. Noise separation synthesis device 22 generates two time signals; one is the time signal of the unwanted noise that is coherent with the reference signal, i.e., bushing sound, the second is the time signal of the background noise.

A comparator 24 is coupled to noise separation synthesis device 22 and receives the coherent unwanted noise signal. Comparator 24 calculates a Kurtosis value of the coherent unwanted noise signal. Comparator 24 then determines if the coherent unwanted noise signal is above a predetermined Kurtosis level and generates a squeak present signal. In the present invention, the threshold Kurtosis value for a stabilizer bar bushing squeak is around 4.3.

Figure 3:
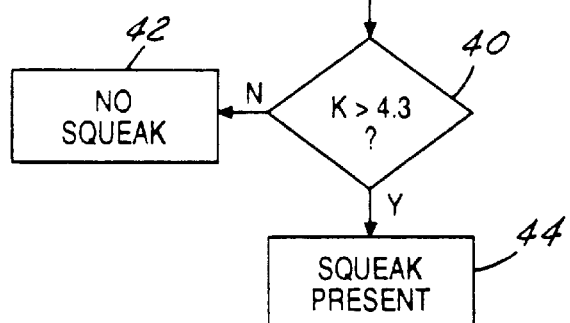
FIG. 3 is a flow chart depicting a method to detect unwanted noise according to one aspect of the invention.

Referring to FIG. 3, a flow chart depicting a method to detect unwanted noise according to one aspect of the invention is illustrated. A reference signal 26 is generated in response to stimulation by a noisy source in step 26, the sequence then proceeds to step 30. Likewise, a combined noise signal, or microphone signal, is generated in response to unwanted and background noise in step 28, the sequence then proceeds to step 30.

After the reference signal and the combined noise signal are generated in steps 26 and 28, step 30 filters both signals between 2,000 Hz and 10,000 Hz. After the filtering process the sequence proceeds to step 32.

After the signals are filtered in step 30, the signals are processed in step 32. Noise synthesis separation (NSS) occurs in step 32. A coherent unwanted noise signal, or sound coherent with the reference signal, is separated from the combined noise signal as a function of the reference signal. Step 32 generates two time signals; one is the time signal of unwanted noise that is coherent with the reference signal, the second is the time signal of the background noise. The background noise signal proceeds to step 34. The sound coherent with the reference signal proceeds to step 36.

After the coherent noise unwanted noise signal is generated and proceeds to step 36, the sequence proceeds to step 38 where the Kurtosis value is calculated. After the Kurtosis value is calculated the sequence proceeds to step 40.

The Kurtosis level of the coherent noise signal is checked in step 40. If the Kurtosis level of the coherent noise signal is less then or equal to approximately 4.3 then there is no squeak and the sequence proceeds to step 42. If the Kurtosis level of the coherent noise signal is greater then approximately 4.3 then a squeak is present and the sequence proceeds to step 44.

Referring back to step 40, if the Kurtosis level is greater then approximately 4.3 then the sequence proceeds to step 44. A squeak present signal is generated in step 44.

From the foregoing, it can be seen that there has been brought to the art a new and improved method and system to detect unwanted noise. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. An apparatus for detecting unwanted noise over background noise, said unwanted noise generated by at least one source, said apparatus comprising:

a reference sensor coupled to said source, said reference sensor generating a reference signal in response to stimulation by said source;

a combined noise detector located in proximity to said source and generating a combined signal, said combined signal comprising said background noise and said unwanted noise;

a noise separation synthesis device coupled to said reference sensor and said noise detector, said noise separation synthesis device receiving said reference signal and said combined signal, said noise separation synthesis device filtering a coherent unwanted noise signal from said combined signal as a function of said reference signal; and a comparator coupled to said noise separation synthesis device and receiving said coherent unwanted noise signal, said comparator calculating a Kurtosis value to generate a squeak present signal above a predetermined Kurtosis level.

2. An apparatus for detecting unwanted noise as recited in claim 1 further comprising a filter coupled between said reference sensor, said combined noise detector and said noise separation synthesis device, whereby said reference signal and said combined signal are filtered before being received by said noise separation synthesis device.

3. An apparatus for detecting unwanted noise as recited in claim 2 wherein said filter comprises a band pass filter.

4. An apparatus for detecting unwanted noise as recited in claim 3 wherein said band pass filter substantially eliminates signals having a frequency below approximately two-kilohertz.

5. An apparatus for detecting unwanted noise as recited in claim 3 wherein said band pass filter substantially eliminates signals having a frequency above approximately ten-kilohertz.

6. An apparatus for detecting unwanted noise as recited in claim 1 wherein said reference sensor comprises an accelerometer.

7. An apparatus for detecting unwanted noise as recited in claim 1 wherein said combined noise detector comprises a microphone.

8. An apparatus for detecting unwanted noise as recited in claim 1 wherein said comparator generates a squeak present signal above approximately 4.3 Kurtosis.

9. A sound detection system for detecting unwanted noise generated by at least one source over background noise, said system comprising:

a vehicle;

an apparatus for detecting unwanted noise located in said vehicle;

a reference sensor coupled to said source, said reference sensor generating a reference signal in response to stimulation by said source;

a combined noise detector located in proximity to said source and generating a combined signal, said combined signal comprising said background noise and said unwanted noise;

a noise separation synthesis device coupled to said reference sensor and said noise detector, said noise separation synthesis device receiving said reference signal and said combined signal, said noise separation synthesis device filtering a coherent unwanted noise signal from said combined signal as a function of said reference signal; and a comparator coupled to said noise separation synthesis device and receiving said coherent unwanted noise signal, said comparator calculating a Kurtosis value to generate a squeak present signal above a predetermined Kurtosis level.

10. A sound detection system as recited in claim 9 further comprising a filter coupled between said reference detector, said combined noise sensor and said noise separation synthesis device, whereby said reference signal and said combined signal are filtered before being received by said noise separation synthesis device.

11. A sound detection system as recited in claim 10 wherein said filter comprises a band pass filter.

12. A sound detection system as recited in claim 11 wherein said band pass filter substantially eliminates signals having a frequency below approximately two-kilohertz.

13. A sound detection system as recited in claim 11 wherein said band pass filter substantially eliminates signals having a frequency above approximately ten-kilohertz.

14. A sound detection system as recited in claim 9 wherein said reference sensor comprises an accelerometer.

15. A sound detection system as recited in claim 9 wherein said combined noise detector comprises a microphone.

16. A sound detection system as recited in claim 9 wherein said comparator generates a squeak present signal above approximately 4.3 Kurtosis.

17. A method for detecting unwanted noise over background noise, said unwanted noise generated by at least one source, said method comprising the steps of:

generating a reference signal in response to stimulation by said source;

generating a combined noise signal, said combined noise signal comprising said background noise and said unwanted noise;

receiving said reference signal and said combined noise signal;

filtering a coherent unwanted noise signal from said combined noise signal as a function of said reference signal;

receiving said coherent unwanted noise signal;

calculating a Kurtosis value for said coherent unwanted noise signal; and generating a squeak present signal above a predetermined Kurtosis level.

18. A method for detecting unwanted noise over background noise as recited in claim 17 further comprising the step of pre-filtering said reference signal and said combined noise signal.

19. A method for detecting unwanted noise over background noise as recited in claim 18 further comprising the step of pre-filtering said reference signal and said combined noise signal to eliminate all signals having a frequency below approximately two-kilohertz.

20. A method for detecting unwanted noise over background noise as recited in claim 18 further comprising the step of pre-filtering said reference signal and said combined noise signal to eliminate all signals having a frequency above approximately ten-kilohertz.

21. A method for detecting unwanted noise over background noise as recited in claim 17 wherein said step of generating a squeak present signal comprises generating a squeak present signal above approximately 4.3 Kurtosis.

* * * * *